(12) United States Patent
Takahashi

(10) Patent No.: US 9,276,978 B2
(45) Date of Patent: Mar. 1, 2016

(54) PROGRAM BASED CACHING IN LIVE MEDIA DISTRIBUTION

(71) Applicant: Microsoft Corporation, Redmond, WA (US)

(72) Inventor: Eduardo S. C. Takahashi, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 461 days.

(21) Appl. No.: 13/732,081

(22) Filed: Dec. 31, 2012

(65) Prior Publication Data

US 2014/0189140 A1    Jul. 3, 2014

(51) Int. Cl.
*G06F 15/16* (2006.01)
*H04L 29/06* (2006.01)
*H04N 21/2187* (2011.01)
*H04N 21/236* (2011.01)
*H04N 21/845* (2011.01)
*G06F 17/30* (2006.01)
(Continued)

(52) U.S. Cl.
CPC .......... *H04L 65/60* (2013.01); *G06F 17/30132* (2013.01); *G06F 17/30516* (2013.01); *G06F 17/30784* (2013.01); *H04N 21/2187* (2013.01); *H04N 21/236* (2013.01); *H04N 21/8456* (2013.01)

(58) Field of Classification Search
CPC ............... H04L 65/60; H04N 21/8456; H04N 21/2187; H04N 21/236; G06F 17/30132; G06F 17/30516; G06F 17/30784
USPC .............. 709/203, 231, 235, 240; 725/86, 93, 725/105
See application file for complete search history.

(56) References Cited

U.S. PATENT DOCUMENTS

| | | | | |
|---|---|---|---|---|
| 5,553,123 A | * | 9/1996 | Chan | ................... G06F 9/44505 379/102.03 |
| 7,027,457 B1 | * | 4/2006 | Chiussi | ................... H04L 47/11 370/414 |
| 7,389,356 B2 | * | 6/2008 | Shao | ................... H04L 12/5693 345/419 |

(Continued)

FOREIGN PATENT DOCUMENTS

WO    WO2011/057560 A1    5/2011

OTHER PUBLICATIONS

International Preliminary Report on Patentability dated Feb. 12, 2015, International Application No. PCT/US2013/077898.

(Continued)

*Primary Examiner* — David Lazaro
*Assistant Examiner* — Vitali Korobov
(74) *Attorney, Agent, or Firm* — Aaron Chatterjee; Kate Drakos; Micky Minhas

(57) ABSTRACT

Live media distribution systems and methods enable scalable and efficient caching of live media content over computer networks. A live media backend generates video fragments for distribution to a content delivery network. The content may originally be streamed live by a live media source. The live media backend determines priority information for the video fragments and attaches a priority identifier to a data envelope for the video segments. The video fragments with the attached priority identifier are sent to a content delivery network. The content delivery network can access the attached priority identifier without analyzing the content of the video fragment to enable intelligent caching of video segments within the media distribution system.

12 Claims, 9 Drawing Sheets

(51) Int. Cl.
*G06F 15/173* (2006.01)
*H04N 7/173* (2011.01)

(56) References Cited

U.S. PATENT DOCUMENTS

| | | | |
|---|---|---|---|
| 7,640,274 B2 | 12/2009 | Tinker et al. | |
| 8,166,191 B1 | 4/2012 | Swaminathan et al. | |
| 2001/0047423 A1* | 11/2001 | Shao | H04L 12/5693 709/235 |
| 2003/0110274 A1 | 6/2003 | Pazi et al. | |
| 2003/0217091 A1 | 11/2003 | Echigo et al. | |
| 2004/0165597 A1* | 8/2004 | Bicknell | H04L 45/04 370/395.31 |
| 2004/0192322 A1* | 9/2004 | Dacosta | H04W 28/20 455/452.1 |
| 2005/0078680 A1* | 4/2005 | Barrett | H04N 7/17336 370/395.4 |
| 2005/0081243 A1* | 4/2005 | Barrett | H04N 7/17336 725/86 |
| 2005/0081246 A1* | 4/2005 | Barrett | H04N 7/17336 725/105 |
| 2005/0097213 A1* | 5/2005 | Barrett | H04N 7/17336 709/231 |
| 2006/0230134 A1 | 10/2006 | Qian et al. | |
| 2006/0230176 A1* | 10/2006 | Dacosta | H04L 29/06027 709/235 |
| 2006/0277330 A1* | 12/2006 | Diepstraten | H04L 12/5693 710/40 |
| 2008/0163313 A1* | 7/2008 | Robyr | H04N 7/17327 725/93 |
| 2011/0083037 A1* | 4/2011 | Bocharov | H04N 21/23116 714/4.11 |
| 2011/0119324 A1* | 5/2011 | Tian | H04N 21/4333 709/203 |
| 2012/0023254 A1 | 1/2012 | Park et al. | |
| 2012/0195362 A1 | 8/2012 | Benno et al. | |
| 2012/0266107 A1* | 10/2012 | Bates | G06F 17/30575 715/838 |

OTHER PUBLICATIONS

Response to the Written Opinion dated Dec. 10, 2014, International Application No. PCT/US2013/077898.
Written Opinion of the International Preliminary Examining Authority dated Oct. 16, 2014, International Application No. PCT/US2013/077898.
Beyls, et al., "Generating Cache Hints for Improved Program Efficiency", in Journal of Systems Architecture: The EUROMICRO Journal, Apr. 2005, 42 pages.
Parker, Conrad, "Towards Adaptive Streaming for Ogg", Published on: May 4, 2012, Available at: http://blog.kfish.org/2010/05/towards-adaptive-streaming-for-ogg.html.
Fecheyr-Lippens, Andrew, "A Review of HTTP Live Streaming", Published on: Jan. 2012, Available at: http://files.andrewsblog.org/http_live_streaming.pdf.
Sarkar, Prasenjit, "Efficient Cooperative Caching Using Hints", in Proceedings of 2nd Symposium on Operating Systems Design and Implementation, Oct. 1996, 13 pages.
Ponnusamy, et al., "An Observed Study on Improved Caching by Adaptive and Partial Aggressive Prefetching", in International Journal Computer Science and Application, Aug. 8, 2012, 5 pages.
Gerard, Fernando, et al., "Dash Evaluation Experiment #4: Delivery Format Addressing," MPEG Meeting, Motion Picture Expert Group or ISO/IEC JTC1/SC29/WG11, Guangzhou, China, Oct. 2010, 27 pages.
Wu, Kun-Lung, et al., "Segment-Based Proxy Caching of Multimedia Streams," Proceedings of the Tenth International Conference on World Wide Web, Jan. 1, 2001, 9 pages.
International Search Report & The Written Opinion of the International Searching Authority dated Apr. 23, 2014, International Application No. PCT/US2013/077898.

* cited by examiner

PROGRAM BASED CACHING IN LIVE MEDIA DISTRIBUTION

BACKGROUND

The disclosed technology is related to live media distribution.

Live media distribution across computer networks has developed as a highly desirable form of providing content to users. Live media content originates from many different sources that often stream the content using network protocols to provide a seamless broadcast of the content at a client device. Although live media content is originally broadcast live, it may remain in a computer network for an extended period of time after its original broadcast. For example, live media may be streamed live and then stored for a short period of time in the system to facilitate personal or digital video recording functions over the network. Additionally, the live content may be stored for longer period of times to enable users to view the content after its original live broadcast.

To provide efficiency, scalability and PVR functionality, many distribution systems rely on chunking and caching between sources of live media and the client devices of users. These systems generally use large cache structures to provide the content to service user requests. Because of the large amounts of data that are generated by live sources, the caches are frequently updated as new content arrives. In many cases, older content is replaced with more recent content. This type of caching often results in potentially sub-optimal content being maintained in the system.

SUMMARY

Systems and methods for live media distribution are disclosed. A live media distribution system is provided that facilitates program and service level caching within the distribution system. A live media stream is divided into media fragments or chunks at a live ingest engine or server before being delivered to client devices through a content delivery network, for example. The live media stream may include video, audio text, and/or metadata in one example. The live ingest engine attaches priority information to the video segments to facilitate more efficient caching within the distribution chain. For example, the backend may attach a program based priority identifier to a cache control extension header for a data envelope such as a data packet for each video segment. The program based priority identifier can enable intelligent caching within the distribution system. The program based priority identifier can be used within the system to make cache decisions without requiring downstream program knowledge and processing by the CDN. By attaching an identifier to the data envelope, the system enables more intelligent caching while maintaining efficiency and reduced latency in the distribution chain. The ingest engine may utilize various sources to generate program based identifiers. External metadata such as program information and priority information from database and internal signals within a live media stream may be used.

One embodiment includes a live media distribution system including a live media backend. The live media backend includes a live ingest engine that receives live media streams. The live ingest engine generates media fragments from the live media streams. The live ingest engine communicates with a program database and priority database to determine program information and priority information for media content. The live ingest engine generates a control header for the data envelope of each media fragment including a priority identifier based on the priority information.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Live media distribution systems and associated methods are provided to enable scalable and efficient caching of live media content over computer networks. A live media backend is provided that generates video fragments or chunks for distribution to a content delivery network. The content may originally be streamed live by a live media source. The live media backend determines priority information for the video fragments and attaches a priority identifier to a data envelope for the video fragments. The priority identifier associates the video fragment with a caching characteristic; it is not a fragment or program identifier. The video fragments with the attached priority identifier are sent to a content delivery network. The content delivery network can access the attached priority identifier without analyzing the content of the video fragment and without knowledge of the program to enable intelligent caching of video fragments within the media distribution system. This provides a balance between a cache that is generally unaware of the value of the distributed content and one that seeks to parse and/or analyze the content itself.

The live media backend attaches a priority identifier to video fragments as header information in one embodiment. In this manner, the priority identifier can be accessed without analyzing the content in the video segment. A content delivery network, for example, may base cache strategy and replacement decisions on priority header information to quickly process video fragments. Accordingly, the video fragments can be processed without introducing undue latency into the live media distribution chain.

In one embodiment, the live media backend receives an encoded live media stream and generates individual video fragments for distribution within the computer network. The live video stream is analyzed at the live media backend to determine program or service level information associated with the content of the live media stream. The program level information may identify a unit of content such as a television show, movie, concert, for example. Service level information may identify a source of the content, such as a television station, producer, venue, etc. Using the program and/or service level information, the live media backend accesses priority information for the live media stream. For example, popularity or demographic information for the corresponding program or service may be determined. A priority identifier may also include residency time information or cache control tags to indicate potential cache operations. The live media backend attaches the priority identifier and/or tag to a data envelope for the video segment and sends the video segment to the CDN for distribution. The CDN accesses the priority identifier and tags to intelligently cache the video segment to service client requests for the video content.

Figure 1:
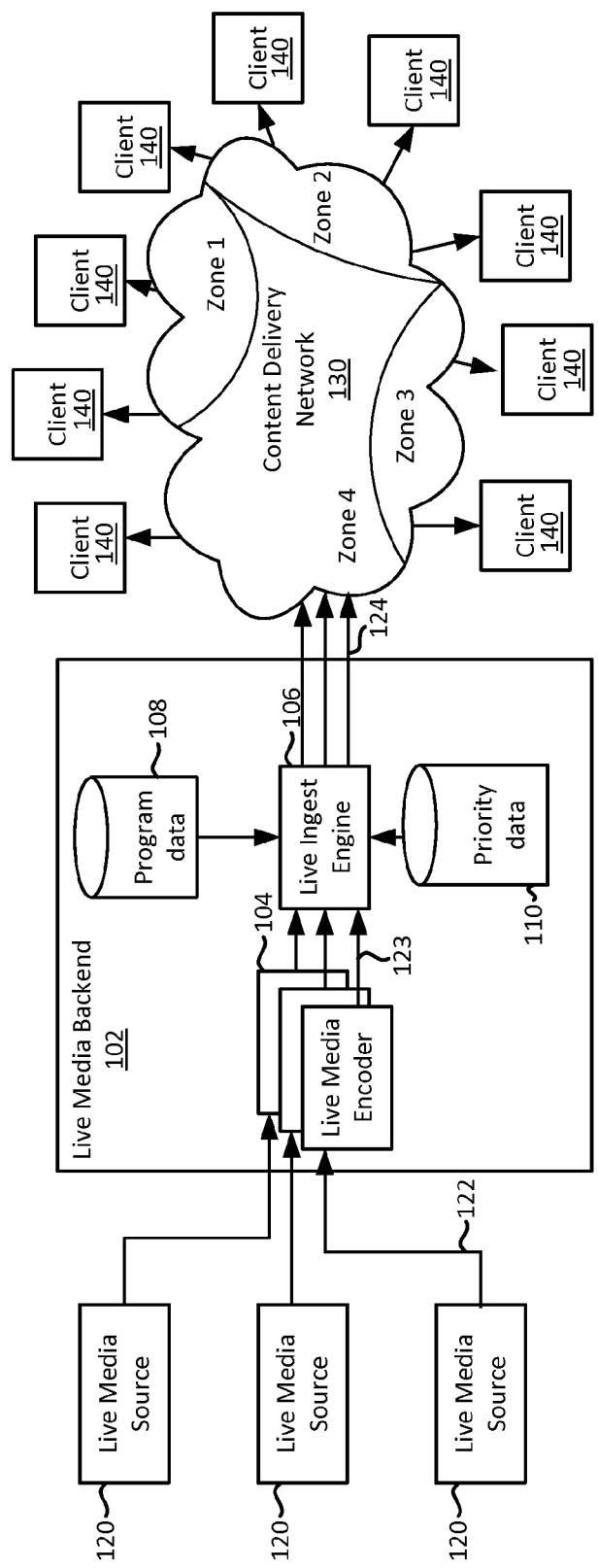
FIG. 1 is a block diagram depicting a live media distribution system.

FIG. 1 is a high level block diagram depicting a live media distribution system in which embodiments of the disclosed technology may be implemented. In FIG. 1, one or more client devices 140 are in communication with a content delivery network 130 to receive content such as a live media stream 122 from live media sources 120. A live media backend 102 is in communication with the content delivery network 130 to enable an efficient and scalable delivery of the live media sources 120 to the client devices. Although three live media sources and nine client devices 140 are illustrated, any number of client devices and media sources may be included in any given implementation.

Client devices 140 may include any type of device such as a personal computer, workstation, mainframe, server, tablet, PDA, cell phone, or other processor-based computing device. The client devices may be mobile devices or non-mobile devices. Mobile devices include cellular telephones, palmtops, pocket computers, personal digital assistants, personal organizers, personal computers (PCs), and the like. Embodiments can be used with any number of computer systems, such as desktop computers, other hand-held devices, laptop or notebook computer systems, multiprocessor systems, microprocessor based or programmable consumer electronics, network PCs, mini computers, main frame computers and the like. Reference to client devices is made hereinafter by example but it will be understood to include reference to computing devices in general except where noted.

The content delivery network 130 may include any number of servers and storage devices to provide video chunks from the live media backend to client devices 140. The content delivery network may implement a multi-level cache to temporarily store media fragments to reduce propagating requests to the original live media source after initial broadcast of the live media source. For example, the content delivery network can include any number of level 1, level 2 and edge caches to efficiently store and provide content to the clients. Requests can be satisfied by the edge caches if the content is available and propagate through the level 1 and level 2 caches as needed. Additional cache levels may be used.

The live media sources 120 provide various type of media, including video, audio, documents, text, captions, metadata, groups of pictures and so forth. The live media may be provided in any available format for consumption by the live media backend 102. For example, the live media sources may include satellites, terrestrial broadcasters, internet broadcasters, cable providers and the like. The live media can include analog or digital signals in various types of encodings. The live media sources can include encoders that encode the live media into one or more encoding formats at various bit rates to satisfy various client requests. Live media sources 120 may provide video, for example, in formats according to .avi, .mpg, .mpeg, .mpeg2, .mov, etc. standards. Numerous other types of media sources may be received.

The live media sources, live media backend, content delivery network and client devices many communicate over any number of networks implementing various network protocols. These networks can include any combination of local area networks, wide area networks (WAN), the Internet, and/or any other network. Networks typically include at least one public network such as the Internet with the various components communicating using well know communication protocols such as HTTP, HTTPs, etc. The communication described herein and transmission of live media content can be accomplished using any number of well-known communication and network protocols. They can include a packet, cell, message, or signal used to ask for and receive resources. Some examples include the HTTP communication protocol over a TCP/IP network protocol, HTTPS over SSL, FTP, etc.

The live media streams may be provided using any number of transport mechanisms or broadcasts. By way of example, unicast or multicast transmission may be used. Unicast uses a one-to one connection between client and server and IP delivery methods such as Transmission Control Protocol (TCP) and User Datagram Protocol (UDP), which are session-based protocols. Client have a direct relationship to the server. Multicast is a broadcast where the source uses multicast-enabled routers to forward packets to all client subnets that have listening clients. No direct relationship between the clients and server are established. Each client that receives the multicast generally adds no additional overhead by virtue of the server sending one stream per multicast station.

Live media backend 102 includes live media encoders 104 that receive live video content from the live media sources 120 and encode it for use by the media distribution system. The live media encoders may encode data from a live media stream 122 or other source to generate one or more encoded formats of the data for the live ingest engine 106. In this example, each encoder receives one live media stream 122 and provides one media stream 123 to the live ingest engine 106. In other examples, each encoder can generate multiple encoded formats in parallel from a single media stream or multiple media streams. For example, the encoders may receive the live media streams 122 in a first format and provide multiple different formats, for example with different bit rates, as outputs eventually available to client devices 140.

The live ingest engine 106 may include one or more live ingest servers that ingest the encoder media streams. The live ingest engine 106 creates and stores media fragments based on the encoded media from the encoders. The media fragments may be generated on the fly as they are requested or prefetched and stored by the live ingest engine. The live ingest engine may receive pushed data, such as from an HTTP post from the encoders or via a pull by requesting data from the encoders. In one example, the live ingest engine may interface with origin servers that respond to client requests for media fragments. The ingest engine may generate a data envelope or packet for the requested media fragment, such as an HTTP packet or MP4 container.

Live ingest engine 106 creates a priority identifier for each media fragment to enable intelligent caching within the media distribution system. The priority identifier is attached to each media fragment by the ingest engine to permit processing within the distribution system without examining the data content of the media fragment. The ingest engine attaches the priority identifier to the media fragment as part of a header for the data envelope in one embodiment. For example, the ingest engine may attach the priority identifier as a header to an HTTP packet. The ingest engine may utilize an extension header of an HTTP format to enable a cache control header based on the priority identifier.

Live ingest engine interfaces with a program database 108 and priority database 110 to generate priority identifiers in one embodiment. The ingest engine can perform a lookup in the program database to identify a video segment based on a timestamp in the received media stream. Programs may include any discrete unit of media, such as television show, movie, music video, or simply a specific time period of a particular media stream. By correlating the received stream and timestamp, the ingest engine can perform a lookup to determine a corresponding program. Although a program database 108 is depicted as part of the live media backend 102, other sources may be utilized for program data.

Based on the program, the ingest engine 106 determines priority information from priority database 110. The priority database includes priority information organized by program in one example. In one example, the priority database stores a priority identifier or priority rating according to a predefined priority case. The priority information may include popularity information for programs or residency information directly relating to how long a program should be cached. The ingest engine can use the popularity information and/or the demographic information to generate a priority identifier for each video segment. In one example, the ingest engine can attach the popularity and demographic information to the data envelope directly as the priority identifier. In another example, the ingest engine can process the popularity and demographic information to generate an independent priority identifier for the video segment.

Various types of popularity data and demographic data can be used and storage by live media backend 102. The popularity data is a popularity rating on a predefined popularity scale in one embodiment. For example, a scale can be defined and the popularity data generated based on popularity information associated with a program. A popularity rating for a television series may be generated and used as the popularity data when looking up a particular live show from the series. Popularity data may also be organized at the service level. For example, popularity data can be provided for different stations, broadcasters, or other live media sources. Popularity data may further include popularity information for actors, music or other content that may be associated with a particular program. Demographic data can include geographic or other demographic data associated with users of client device 140. For example, information relating to popularity of programs by geographic area may be included. Demographic data can include popularity information divided into geographic and other groupings of users in other examples.

Although specific components and software modules are depicted, it will be apparent that numerous physical and software based configurations may be employed while remaining within the spirit of the present disclosure. Generally, software and program modules, managers and engines as described herein include routines, programs, components, data structures, and other types of structures that perform particular tasks or implement particular abstract data types. Hardware or combinations of hardware and software can be substituted for software modules as described herein.

Figure 2:
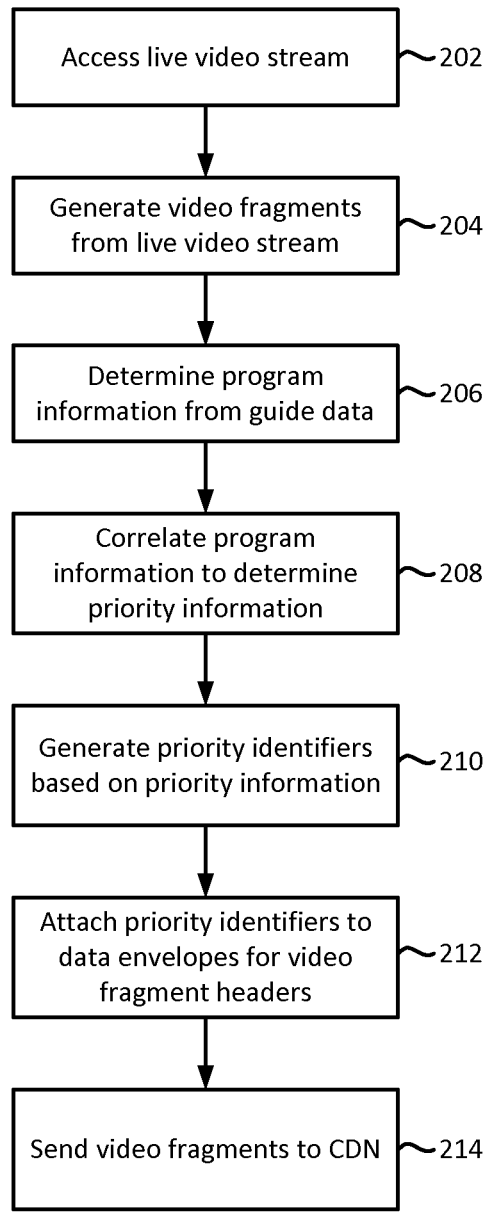
FIG. 2 is a flowchart describing a method for generating video fragments with priority information.

FIG. 2 is a flowchart describing processing of a live video stream by ingest engine 106 in one embodiment. At step 202, the ingest engine accesses a live video stream from a live video encoder 104. At step 204, the ingest engine generates video fragments as the live video stream is received from the encoder. At step 206, the ingest engine determines program information for the live video stream. The ingest engine may access a program database or other metadata source to determine program information. In one embodiment, the ingest engine determines program information for each individual video fragment. The ingest engine may also determine program information for a range of video segments using a single lookup. At step 208, the ingest engine uses the program information as a lookup to determine priority information for each video segment. In one embodiment, the priority information includes popularity and/or demographic information organized by program. The priority information may include priority ratings, popularity ratings and/or residency time ratings. The ingest engine may correlate various popularity and demographic data as earlier described to determine the relevant information for a particular program. At step 210, the ingest engine generates a priority identifier based on the popularity and/or demographic data from step 208. In one embodiment, the ingest engine looks up a priority identifier based on the program. The priority identifier may include a popularity rating and/or demographic information in one example. In another example, the ingest engine processes the popularity and demographic information to generate the priority identifier. At step 212, the ingest engine attaches the priority identifier to the data envelope for the video fragment. For example, the ingest engine may generate and attach the priority identifier to a cache control header for an HTTP message. At step 214, the ingest engine provides the video fragment to the content delivery network.

Figure 3:
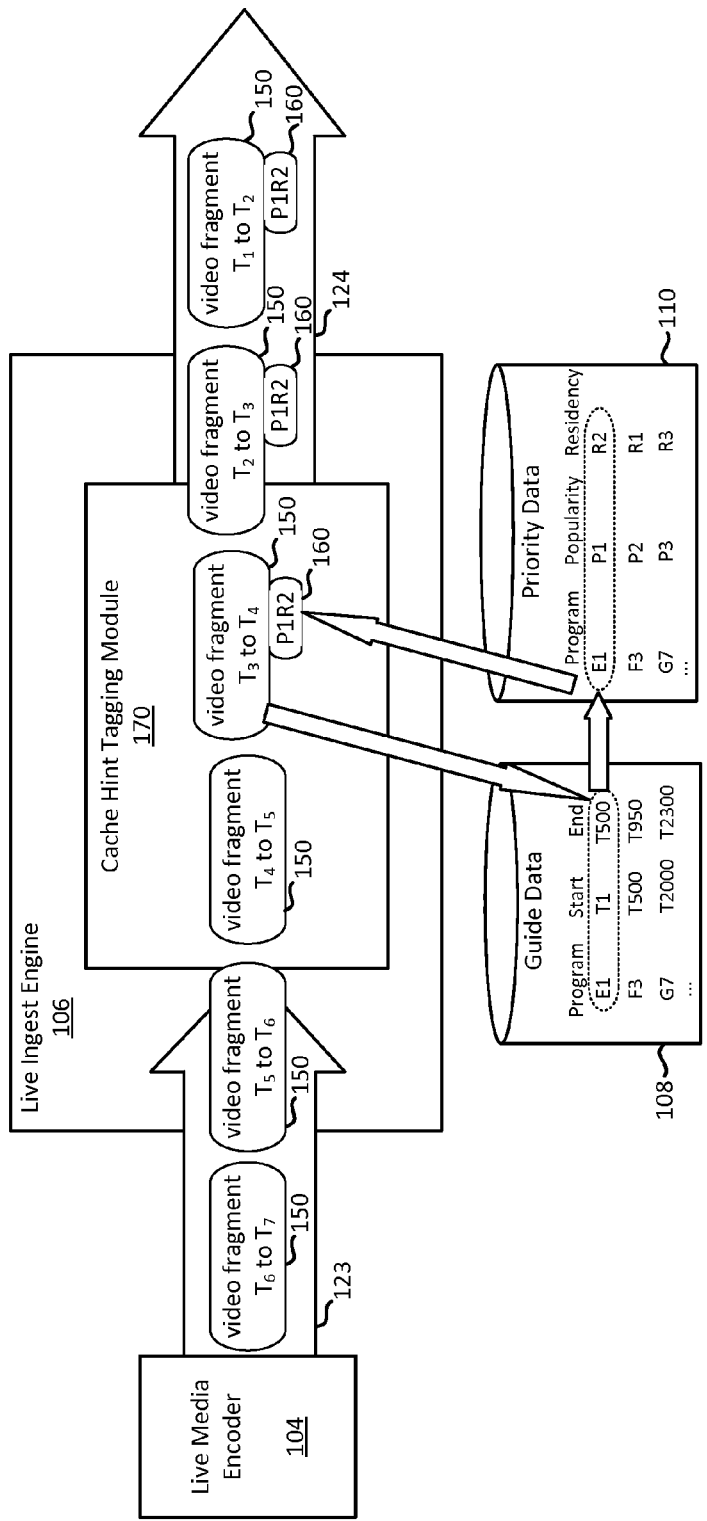
FIG. 3 is a block diagram depicting processing of a live video stream by a live ingest engine to generate video fragments with priority information.

FIG. 3 is a high level block diagram depicting one embodiment of the live media backend and describing processing of an example live video stream. Live video encoder 104 generates a live media stream 123 including a live video stream at a target encoding and bit rate for consumption by the live ingest engine 106. The live video stream includes video fragments 150 that are passed to a cache hint tagging module 170 within the live ingest engine 106 for processing. The tagging module 170 analyzes the individual video fragments to generate an output media (video) stream 124 including video fragments with priority identifiers 160.

In the specifically described example, video fragments T1 to T2, T2 to T3 and T3 and T4 have been processed with an appended priority identifier 160 and video fragments T4 to T5, T5 to T6 and T6 to T7 are awaiting processing by the cache hint tagging module. Tagging module 170 accesses program database 108 to determine a program identifier to process video fragment T3 to T4. In this example, the tagging module correlates the time T3 to T4 as within the T1 to T500 time period in the guide data. From this information, program E1 is identified as corresponding to the content within time T3 to T4. The tagging module then uses program E1 as a lookup into the priority database. In this example, the priority database includes a popularity data and residency data. The popularity data includes a popularity rating P1 and the residency data includes a residency rating R1. A popularity scale of P1 to P10 could be used where P1 is the highest rating and P10 is the lowest rating. Similarly, a residency scale of R1 to R10 could be established where R1 includes the longest time period or residency for caching and R10 includes the shortest time period or residency for caching. Tagging module 170 then generates a priority identifier 160 that includes the popularity rating and residency rating from the priority database. As described earlier, the tagging module may alternatively generate a priority identifier based on processing of the popularity and residency ratings or other popularity and residency data.

Residency data may include information to indicate how long a video fragment should be cached or otherwise maintained in the media distribution system. A residency rating may be useful to enable beneficial caching of less popular content in one example. For example, more recent but less popular content may benefit from being cached over more popular but older content in some situations. More recently streamed content that is less popular content may be requested more than more popular but older content for some period of time after the more recently content is streamed. If cache decisions are based solely on popularity, the more recent content may not be cached. Residency data may be used to indicate that less popular but more recent content should be maintained over other content.

Figure 4:
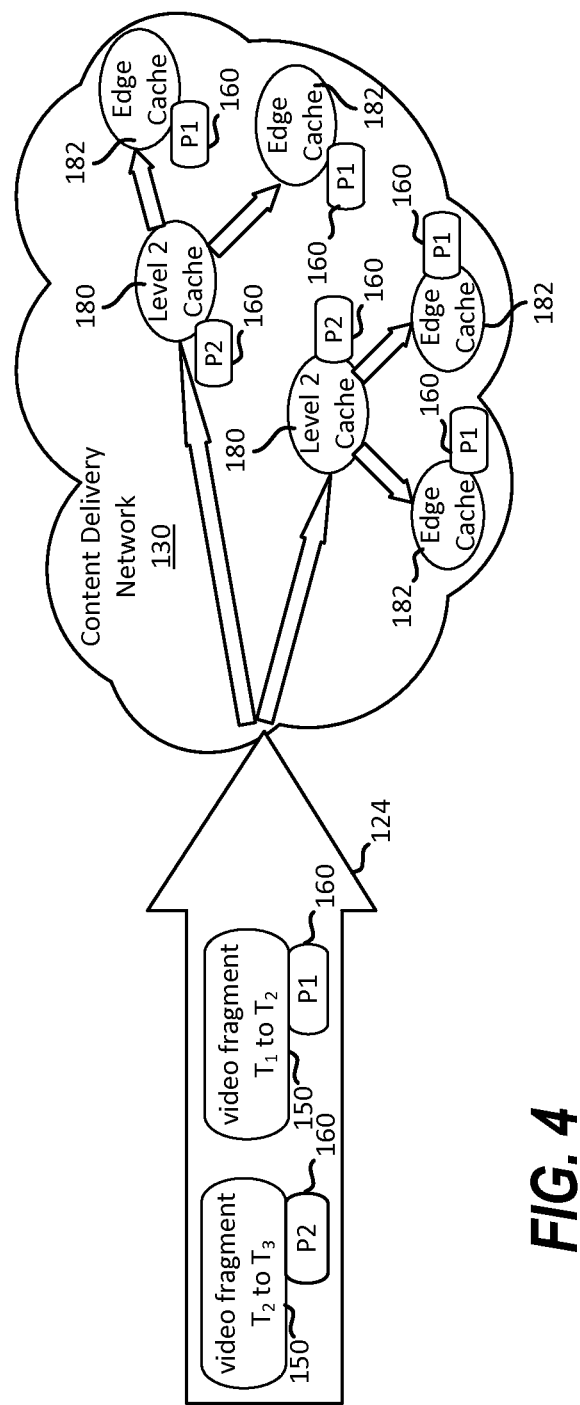
FIG. 4 is a block diagram depicting multi-level caching according to priority information.

FIG. 4 is a high level block diagram depicting caching by the content delivery network 130 in one embodiment. A live media stream 124 including a live video stream is delivered from the live media backend to the CDN 130. In this example, two video fragments 150 are depicted in the video stream. Video fragment T1 to T2 includes a priority identifier 160 with a popularity rating P1 and video fragment T2 to T3 includes a priority identifier 160 with a popularity rating P2.

The CDN 130 in FIG. 4 includes a multi-level cache structure with a level 2 cache 180 and edge cache 182. CDN 130 receives the live video stream and prioritizes video fragments 150 within the cache hierarchy according to their popularity ratings. Video fragments with a higher popularity rating P1 are stored at the edge caches 182 closer to the client devices. Video segments with a lower popularity rating P2 are stored at the level 2 caches 180 further from the client devices.

Although not depicted, a residency rating can also be used to facilitate intelligent caching within the multi-level cache structure. Video segments with lower residency ratings can be stored at the level 2 caches while video segments with higher residency ratings can be stored at the edge caches. The popularity ratings and residency ratings can be used in various ways to facilitate caching within the multi-level structure. Combinations of the residency ratings and popularity ratings can be used to store segments at different levels of the cache. In one example, a video segment with a lower popularity rating and higher residency rating may be used to replace a video segment with a higher popularity rating but lower residency rating at the edge cache. The lower popularity rating, higher residency rating video segment may in turn be moved to the level 2 cache. Other options for manipulating the cache using the residency and popular ratings may be used.

Figure 5:
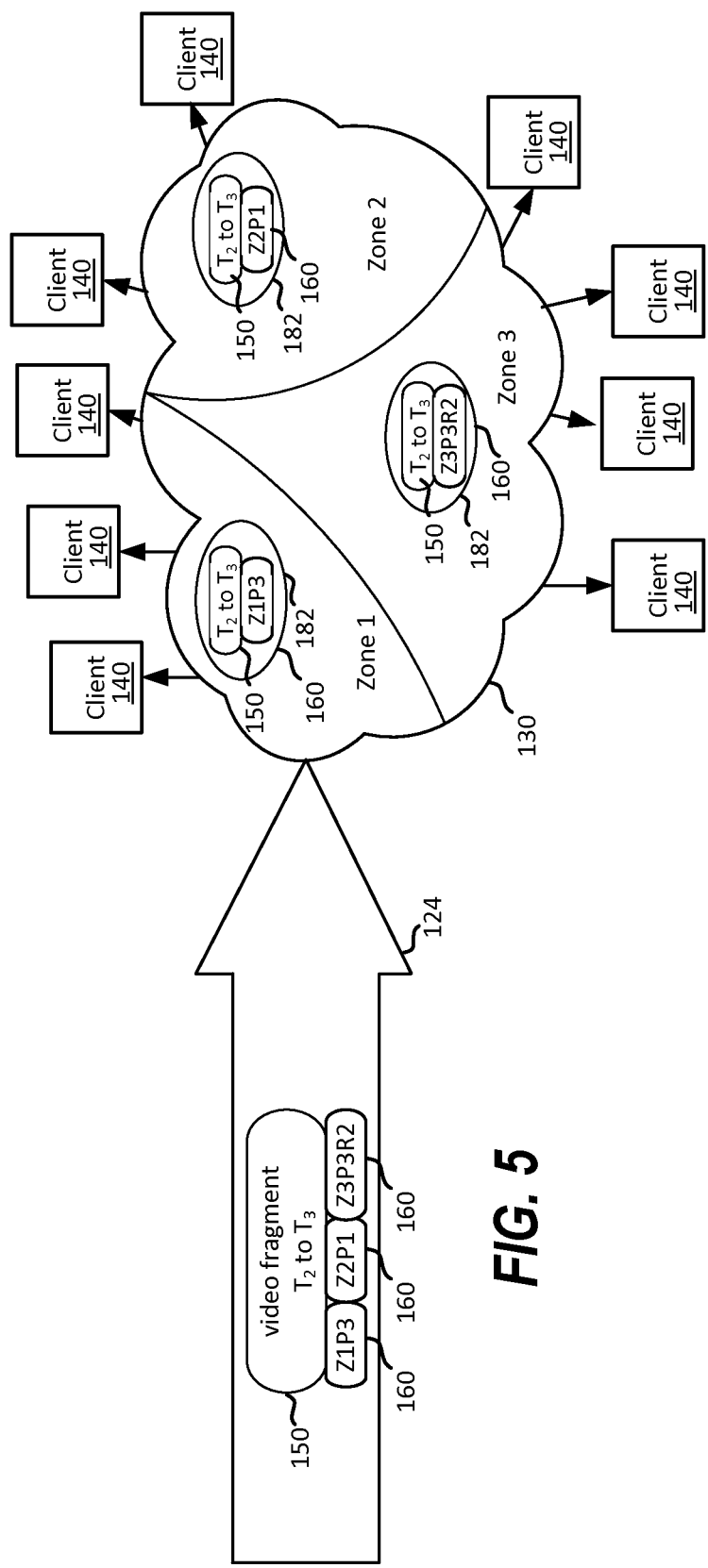
FIG. 5 is a block diagram depicting caching according to priority information by target zone.

FIG. 5 is a high level block diagram depicting caching by the content delivery network 130 using priority information by target zone in one embodiment. Live media stream 124 is delivered from the live media backend to the CDN 130. In this example, a single video fragment is illustrated after processing by the live media backend 102. The video fragment 150 includes three priority identifiers in this example corresponding to different zones within the CDN 130. The live ingest engine determines that for Zone 1, the priority information includes a popularity rating of P3. For Zone 2, it determines that the priority information includes a popularity rating of P1. For Zone 3, the live ingest engine determines that the priority information includes a popularity rating of P3 and additionally, a residency rating of R2. Accordingly, the ingest engine generates three different priority identifiers for each of the individual zones. Each priority identifier includes a target zone identifier Z1, Z2 or Z3. It is noted that the inclusion of three zones is merely by way of example. Any number of zones may be used. Additionally, the ingest engine may apply zone information if it is available and for zones where it is not it may simply use general priority information.

Figure 6:
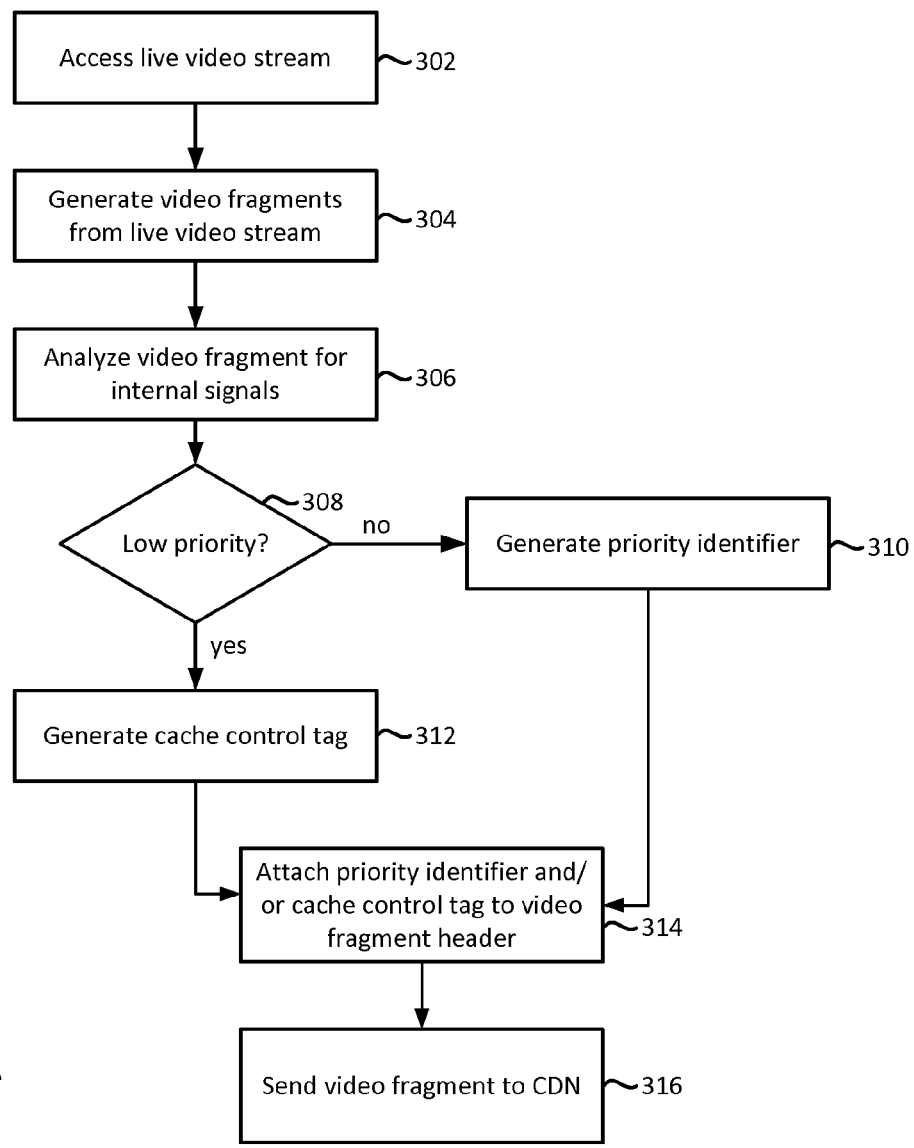
FIG. 6 is a flowchart describing a method of using internal signals to generate priority information for video fragments.

FIG. 6 is a flowchart describing operation of the live ingest engine in one embodiment that exposes internal signals within a live video stream to facilitate intelligent caching within the media distribution system. The live ingest engine accesses a live video stream at step 302 and generates video fragments from the video stream at step 304. The video fragments are analyzed for internal signals at step 306. In one embodiment, the live ingest engine examines the video fragments for either embedded or exposed signals within the video stream. For example, the live ingest engine may detect signals indicating advertisements in a video stream. Such signals may be provided to facilitate advertisement replacement by local broadcasters, for example. These advertisements or time periods in the video stream are often referred to as local avails or local availability. The live ingest engine may detect digital program insertion (DPI) signals for example. One type of embedded program signaling that the ingest engine may detect is inline control signaling such as SCTE-35 or SCTE-30 messages that can be used for advertisement replacement.

At step 308, the live ingest engine determines whether any of the internal signals in the video stream indicate that the video segment may deserve more or less priority for caching in the media distribution system. For example, the ingest engine may determine from an internal signal indicating an advertisement or local avail that a video segment should be given lower priority, or the ingest engine may determine from an internal signal indicating source content for the video stream that a video segment should be given higher priority. For example, a signal indicating that an advertisement has ended may be used to give higher priority to subsequently received video segments.

If the video segment includes an internal signal indicating that the video stream may include less popular or lower priority content, the live ingest engine generates a cache control tag or other identifier at step 312. The cache control tag can expose the internal signal from the video stream directly to the CDN. This enables the CDN to intelligently cache and understand the content of the video segment without having to analyze the video content itself. The cache control tag can indicate to the CDN that the video segments correspond to a local avail or other advertisement. Although not illustrated, the live ingest engine may generate a priority identifier for a video segment based on the internal signal. This can be done in addition to generating the local availability tag at step 312. Additionally, the live ingest engine may generate a priority identifier based on the internal signal without generating the local availability tag at step 312. If the video segment does not include an internal signal indicating that the video stream may include less popular or lower priority content, the live ingest engine generates a priority identifier at step 310 as described in FIG. 6. The priority identifier may include or be based on popularity data, demographic data, etc.

At step 314, the live ingest engine attaches the local availability tag from step 312 or the priority identifier from step 310 to the video segment data envelope. As earlier described, the live ingest engine may attach a priority identifier from step 312 in addition to or in place of the local availability tag. At step 316, the live ingest engine sends the video segment with the priority identifier and/or local availability tag.

Figure 7:
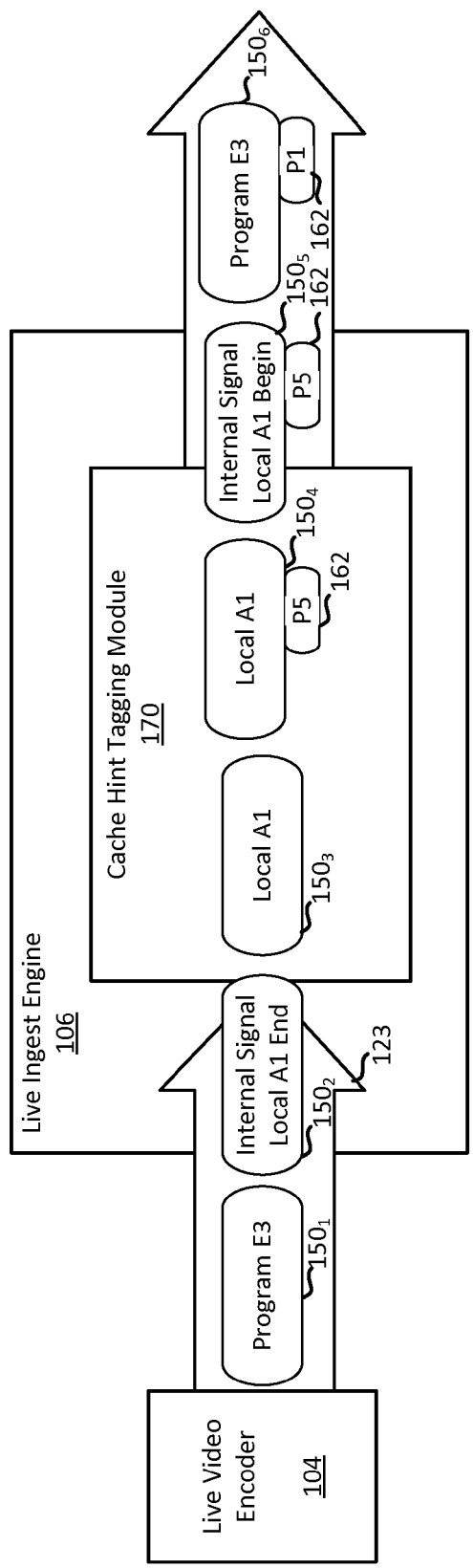
FIG. 7 is a block diagram depicting processing of a live video stream by a live ingest engine to generate video fragments with priority information using internal signals.

FIG. 7 is a high level block diagram depicting processing of internal signals by live ingest engine 106 in one embodiment. The live ingest engine receives a live media stream 123 with video segments 150. In this example, the video segments $150_1$ and $150_6$ correspond to source content including a program E3 as the live ingest engine may determine from a program database. Other video segments $150_2$, $150_3$, $150_4$ and $150_5$ are associated with an advertisement Local A1. The cache hint tagging module 170 detects an internal signal in video segment $150_5$. The internal signal indicates that an advertisement Local A1 is beginning in the video stream. The signal indicates that the advertisement may be replaced with another advertisement by a local broadcaster or even the client itself, for example. Based on the internal signal, the live ingest engine determines that the corresponding video segments should be given less priority for caching in the media distribution system. The live ingest engine attaches a priority identifier P5 indicating a relative low caching priority for the video segments associated with the advertisement Local A1. The live ingest engine detects an internal signal in video segment $150_2$ indicating that the advertisement has ended. Accordingly, the live ingest engine determines that the source content is again included. Accordingly, the live ingest engine will attach a priority identifier P1 to video segment $150_1$. Although FIG. 7 depicts a low popularity rating P5 for the video segments associated with the internal signals, a cache control or local availability tag can be generated as earlier described.

Figure 8:
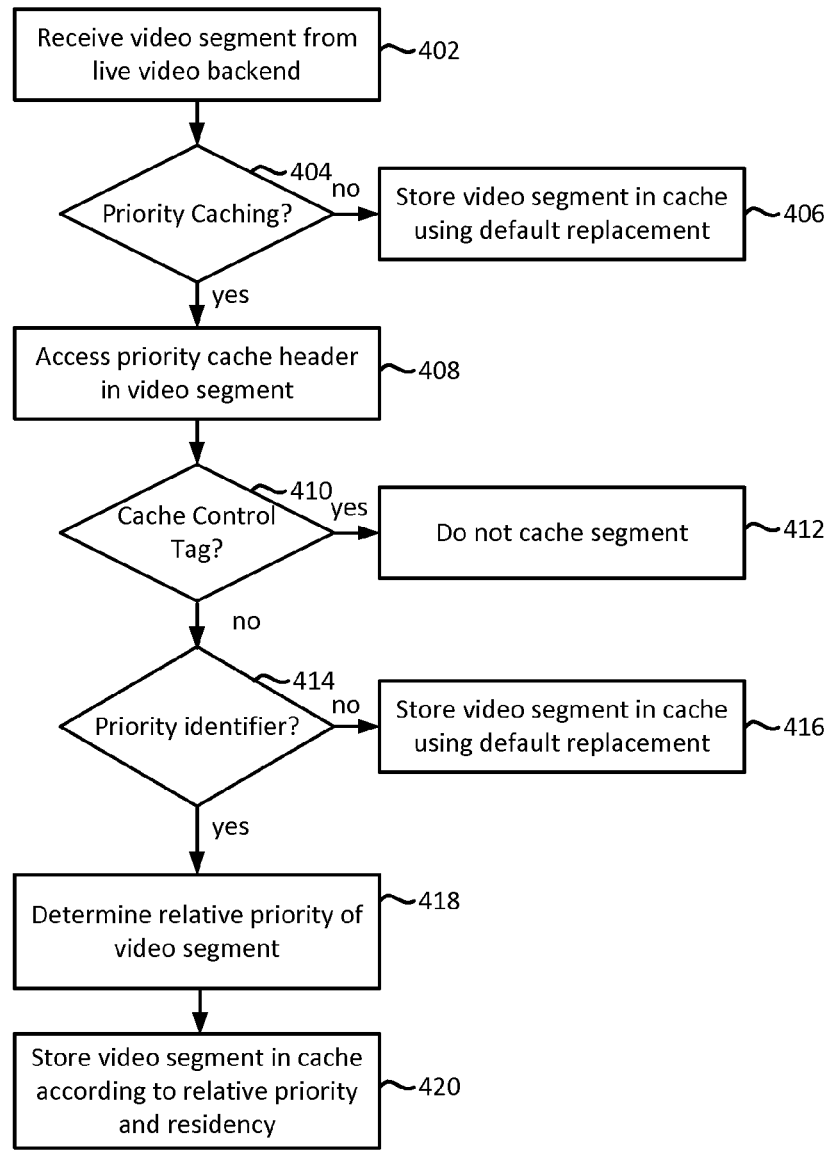
FIG. 8 is a flowchart describing a method of caching by a content delivery network using priority information.

FIG. 8 is a flowchart describing operation by the content delivery network in one embodiment to process video segments for caching. At step 402, the content delivery network 130 receives a video segment from the live media backend. At step 404, the CDN determines whether a priority caching mode is enabled. If the priority caching mode is not enabled, the CDN stores the video segment in the distribution system using default cache replacement techniques at step 406. For example, the CDN may replace the oldest item in the cache to enable the most recent item to be stored. Other default cache replacement techniques may also be used.

If the priority caching mode is enabled, the CDN accesses a cache control header of the data envelope for the video segment at step 408 to determine if the video segment includes any priority tags or identifiers. At step 410, the content delivery network determines if the extension header includes a cache control or local availability tag. If the extension header includes a cache control tag, the CDN determines that that video segment includes an advertisement. At step 412, the CDN determines that the video segment should not be cached. In other example, the CDN may choose to give the video segment lower priority at step 412 rather than not cache it.

If there is no cache control tag, the CDN determines if the extension header includes a priority identifier at step 414. If there is no priority identifier for the video segment, the CDN utilizes a default caching technique at step 416 to store the video segment in the media distribution system. If the video segment includes a priority identifier, the CDN determines the relative priority of the video segment (e.g popularity and/or residency) at step 418. Using the popularity and/or residency rating, the CDN determines a relative priority for caching the video segment in the media distribution system relative to other video segments and their relative caching priority. At step 420, CDN stores the video segment in the cache structure according to the relative priority of the video segment. For example, the CDN may select a video segment having a lowest priority relative to the selected video segment and replace it with the selected video segment.

Figure 9:
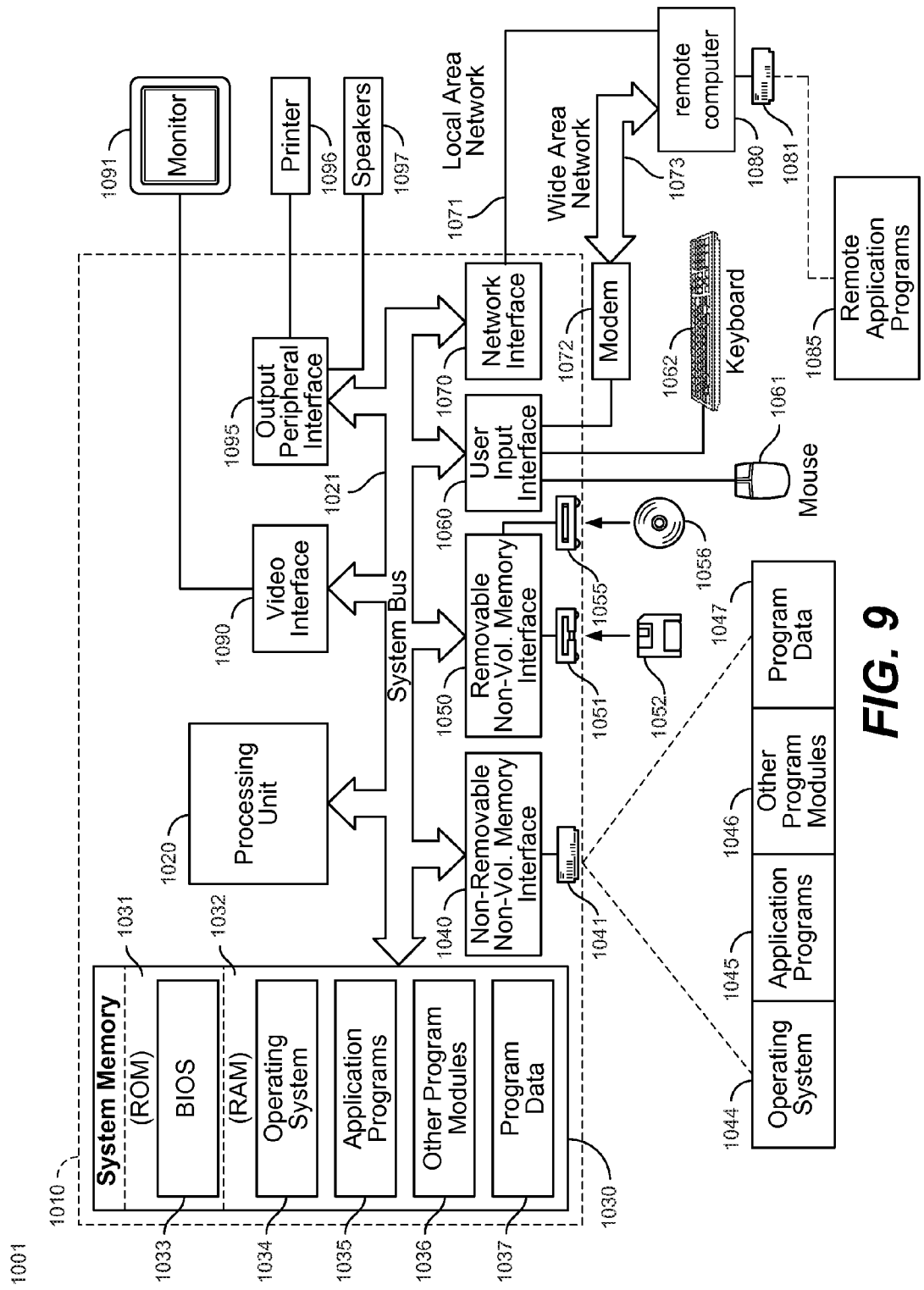
FIG. 9 is a block diagram of a computing system that can be used to implement components and perform methods of the disclosed technology.

With reference to FIG. 9, an example system for implementing the various components of the described system and method may include a general purpose computing device. Computing device 1010 may be used to implement all or a portion of any of the components in FIG. 1, such as the live media backend, live media sources, CDN and client devices. The computing device may be used to implement servers or other computing machines for these components. The computing device 1010 is only one example of a suitable computing system and is not intended to suggest any limitation as to the scope of use or functionality of the presently disclosed subject matter. Neither should the computing device be interpreted as having any dependency or requirement relating to any one or combination of components illustrated in the exemplary operating system. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Components of computing device 1010 may include, but are not limited to, a processing unit 1020, a system memory 1030, and a system bus 1021 that couples various system components including the system memory to the processing unit 1020. The system bus 1021 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computing device 1010 may include a variety of computer readable media. Computer readable media can be any available media that can be accessed by computing device 1010 and includes both volatile and nonvolatile media, removable and non-removable media. By way of example, and not limitation, computer readable media may comprise computer readable storage media and communication media. Computer readable storage media includes volatile and nonvolatile, as well as removable and non-removable media implemented in any method or technology for storage of information such as computer readable instructions, data structures, program modules or other data. Computer readable storage media includes, but is not limited to, random access memory (RAM), read only memory (ROM), EEPROM, flash memory or other memory technology, CD-ROMs, digital versatile discs (DVDs) or other optical disc storage, magnetic cassettes, magnetic tapes, magnetic disc storage or other magnetic storage devices, or any other medium which can be used to store the information and which can be accessed by computing device 1010. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as RF and other wireless media. Combinations of any of the above are also included within the scope of computer readable media.

The system memory 1030 includes computer storage media in the form of volatile and/or nonvolatile memory such as ROM 1031 and RAM 1032. A basic input/output system (BIOS) 1033, containing the basic routines that help to transfer information between elements within computing device 1010, such as during start-up, is typically stored in ROM 1031. RAM 1032 typically contains data and/or program modules that are immediately accessible to and/or presently being operated on by processing unit 1020. By way of example, and not limitation, FIG. 9 illustrates operating system 1034, application programs 1035, other program modules 1036, and program data 1037.

The computing device 1010 may also include other removable/non-removable, volatile/nonvolatile computer storage media. By way of example only, FIG. 9 illustrates a hard disc drive 1041 that reads from or writes to non-removable, non-volatile magnetic media and a magnetic disc drive 1051 that reads from or writes to a removable, nonvolatile magnetic disc 1052. Computing device 1010 may further include an optical media reading device 1055 to read and/or write to an optical media.

Other removable/non-removable, volatile/nonvolatile computer storage media that can be used in the exemplary operating environment include, but are not limited to, magnetic tape cassettes, flash memory cards, DVDs, digital video tapes, solid state RAM, solid state ROM, and the like. The hard disc drive 1041 is typically connected to the system bus 1021 through a non-removable memory interface such as interface 1040. Magnetic disc drive 1051 and optical media reading device 1055 are typically connected to the system bus 1021 by a removable memory interface, such as interface 1050.

The drives and their associated computer storage media discussed above provide storage of computer readable instructions, data structures, program modules and other data for the computing device 1010. In FIG. 9, for example, hard disc drive 1041 is illustrated as storing operating system 1044, application programs 1045, other program modules 1046, and program data 1047. These components can either be the same as or different from operating system 1034, application programs 1035, other program modules 1036, and program data 1037. Operating system 1044, application programs 1045, other program modules 1046, and program data 1047 are given different numbers here to illustrate that, at a minimum, they are different copies.

A user may enter commands and information into the computing device 1010 through input devices such as a keyboard 1062 and a pointing device 1061, commonly referred to as a mouse, trackball or touch pad. Other input devices (not shown) may include a microphone, joystick, game pad, satellite dish, scanner, or the like. These and other input devices are often connected to the processing unit 1020 through a user input interface 1060 that is coupled to the system bus 1021, but may be connected by other interface and bus structures, such as a parallel port, game port or a universal serial bus (USB). A monitor 1091 or other type of display device is also connected to the system bus 1021 via an interface, such as a video interface 1090. In addition to the monitor, computers may also include other peripheral output devices such as speakers 1097 and printer 1096, which may be connected through an output peripheral interface 1095.

The computing device 1010 may operate in a networked environment using logical connections to one or more remote computers, such as a remote computer 1080. The remote computer 1080 may be a personal computer, a server, a router, a network PC, a peer device or other common network node, and typically includes many or all of the elements described above relative to the computing device 1010, although only a memory storage device 1081 has been illustrated in FIG. 9. The logical connections depicted in FIG. 9 include a local area network (LAN) 1071 and a wide area network (WAN) 1073, but may also include other networks. Such networking environments are commonplace in offices, enterprise-wide computer networks, intranets and the Internet.

When used in a LAN networking environment, the computing device 1010 is connected to the LAN 1071 through a network interface or adapter 1070. When used in a WAN networking environment, the computing device 1010 typically includes a modem 1072 or other means for establishing communication over the WAN 1073, such as the Internet. The modem 1072, which may be internal or external, may be connected to the system bus 1021 via the user input interface 1060, or other appropriate mechanism. In a networked environment, program modules depicted relative to the computing device 1010, or portions thereof, may be stored in the remote memory storage device. By way of example, and not limitation, FIG. 9 illustrates remote application programs 1085 as residing on memory device 1081. It will be appreciated that the network connections shown are exemplary and other means of establishing a communication link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the invention be defined by the claims appended hereto.

What is claimed is:

1. A computer readable storage medium having computer readable instructions for programming a processor to perform a method for distributing live media over a computer network, the method comprising:
   receiving a live media stream;
   generating a set of media fragments from the live media stream for distribution to a content delivery network;
   generating a data envelope for each media fragment of the set of media fragments and generating a cache control header for the data envelope of each media fragment;
   determining a priority identifier for each media fragment of the set of media fragments, including:
      determining a program corresponding to each media fragment;
      determining a popularity rating associated with the program corresponding to each media fragment;
      determining a residency rating associated with the program corresponding to each media fragment, the residency rating indicating how long a program should be cached; and
      generating the priority identifier for each media fragment, the priority identifier including the popularity rating and the residency rating;

attaching the priority identifier to the cache control header of the data envelope for each media fragment of the set of media fragments; and providing the set of media fragments with the priority identifiers to the content delivery network;

wherein the priority identifier indicates that a media fragment with a lower popularity rating and a higher residency rating is to replace a media fragment with a higher popularity rating and a lower residency rating at an edge cache.

2. A computer readable storage medium according to claim 1, wherein:

the method further comprises determining a first target zone and a second target zone in the content delivery network for the set of media fragments;

determining the priority information includes determining first priority information based on the first target zone and second priority information based on the second target zone for the set of media fragments; and attaching priority identifiers to the media fragments includes attaching a first priority identifier having a first value and a first target zone identifier and a second priority identifier having a second value and a second target zone identifier.

3. A computer readable storage medium according to claim 1, wherein:

determining priority information includes determining priority for each media fragment of the set of media fragments; and attaching priority identifiers to the media fragments includes attaching a first priority identifier having a first value to a first media fragment of the set of media fragments and attaching a second priority identifier having a second value to a second media fragment of the set of media fragments.

4. A computer readable storage medium according to claim 3, wherein determining priority information for each media fragment includes:

determining a service corresponding to each media fragment;

determining popularity information associated with the service corresponding to each media fragment; and generating a priority identifier for each media fragment based on the popularity information associated with a corresponding service.

5. A computer readable storage medium according to claim 1, wherein the method further comprises:

analyzing the set of media fragments for internal signals indicating changes in content in the live media stream;

determining a subset of media fragments from the set of media fragments that are associated with a first internal signal in the live media stream indicating lower priority content;

generating cache control tags indicating the lower priority content; and attaching the cache control tags to the cache control header of the data envelope for the subset of media fragments.

6. A computer readable storage medium according to claim 5, wherein:

the first internal signal is a digital program insertion signal;

the method further comprises determining that the subset of media fragments include an advertisement based on the digital program insertion signal; and generating the cache control tags includes generating the cache control tags to indicate an advertisement in the subset of media fragments.

7. A live media distribution system, comprising:

at least one storage device including program information associated with media content and priority information associated with the program information; and a processor in communication with the at least one storage device, the processor executes computer readable instructions to receive a live media stream, generate a set of media fragments from the live media stream, generate a data envelope for each media fragment, generate a cache control header for the data envelope of each media fragment, determine a priority identifier for each media fragment of the set of media fragments, and attach the priority identifier to the cache control header of the data envelope of each media fragment of the set of media fragments;

wherein the processor determines the priority identifier for each media fragment by:

determining a program corresponding to each media fragment;

determining a popularity rating associated with the program corresponding to each media fragment;

determining a residency rating associated with the program corresponding to each media fragment, the residency rating indicating how long a program should be cached; and generating the priority identifier for each media fragment, the priority identifier including the popularity rating and the residency rating;

wherein the priority identifier indicates that a media fragment with a lower popularity rating and a higher residency rating is to replace a media fragment with a higher popularity rating and a lower residency rating at an edge cache.

8. A live media distribution system according to claim 7, wherein the processor executes the computer readable instructions to:

determine a first target zone and a second target zone in a content delivery network for the set of media fragments;

determine first priority information based on the first target zone and second priority information based on the second target zone; and generate the control header for the data envelope of each media fragment to include a first priority identifier based on the first priority information and a second priority identifier based on the second priority information.

9. A live media distribution system according to claim 7, wherein the processor determines priority information for each media fragment by:

determining a service corresponding to each media fragment;

determining popularity information associated with the service corresponding to each media fragment; and generating a priority identifier for each media fragment based on the popularity information associated with a corresponding service.

10. A method of distributing live media over a computer network, comprising:

receiving a live media stream at a hardware implemented live media backend;

generating a set of media fragments from the live media stream for distribution to a content delivery network;

generating a data envelope for each media fragment of the set of media fragments and generating a cache control header for the data envelope of each media fragment;

determining a priority identifier for each media fragment of the set of media fragments, including:

determining a program corresponding to each media fragment;

determining a popularity rating associated with the program corresponding to each media fragment;

determining a residency rating associated with the program corresponding to each media fragment, the residency rating indicating how long a program should be cached; and generating the priority identifier for each media fragment, the priority identifier including the popularity rating and the residency rating;

attaching the priority identifier to the cache control header of the data envelope for each media fragment of the set of media fragments; and providing the set of media fragments with the priority identifiers from the hardware implemented live media backend to the content delivery network;

wherein the priority identifier indicates that a media fragment with a lower popularity rating and a higher residency rating is to replace a media fragment with a higher popularity rating and a lower residency rating at an edge cache.

11. A method according to claim 10, further comprising:
determining a first target zone and a second target zone in the content delivery network for the set of media fragments;
wherein determining the priority information includes determining first priority information based on the first target zone and second priority information based on the second target zone for the set of media fragments; and
wherein attaching priority identifiers to the media fragments includes attaching a first priority identifier having a first value and a first target zone identifier and a second priority identifier having a second value and a second target zone identifier.

12. A method of distributing live media according to claim 10, further comprising:
analyzing the set of media fragments for internal signals indicating changes in content in the live media stream;
determining a subset of media fragments from the set of media fragments that are associated with a first internal signal in the live media stream indicating higher priority content;
generating cache control tags indicating the higher priority content; and
attaching the cache control tags to the cache control header of the data envelope for the subset of media fragments.

* * * * *